Aug. 19, 1958   M. D. TYLER   2,848,256
PIPE CONNECTOR

Filed Nov. 21, 1955   2 Sheets-Sheet 1

INVENTOR.
Merle D. Tyler

BY

ATTORNEYS

Aug. 19, 1958  M. D. TYLER  2,848,256
PIPE CONNECTOR

Filed Nov. 21, 1955  2 Sheets-Sheet 2

INVENTOR.
Merle D. Tyler
BY
ATTORNEYS

United States Patent Office 2,848,256
Patented Aug. 19, 1958

2,848,256

PIPE CONNECTOR

Merle D. Tyler, Denver, Colo., assignor to Good-All Electric Mfg. Co., Ogallala, Nebr., a corporation of Nebraska Application November 21, 1955, Serial No. 548,113

1 Claim. (Cl. 285—317)

This invention relates to connectors, and more particularly to quick-acting, grip connectors for cylindrical members, such as pipes, rods, etc.

The joining of two cylindrical members in such a manner that the joint is readily disengageable and still provides a leakproof seal for joined pipes has plagued industry for years. A threaded joint is not satisfactory since it involves a substantial amount of labor and a number of very specialized tools for making the external and internal threads, and a substantial amount of skilled labor is required in joining two threaded members, especially where the members to be joined are long and heavy. Other types of connectors have various defects which reduce their effectiveness where speed of joining, leakproof, reduced labor requirements and strength of joint are prime requisites for the joining of such cylindrical members.

According to the present invention, I have provided a connector for cylindrical members which is strong enough to withstand considerable stresses and strains due to tension and bending, and yet securely holds the cylindrical member under heavy impact loads. The connector is easily and quickly applied to the ends of long cylindrical members, and it is easily removed even after periods of long use. The connector is useful for connecting plain end cylinders, but it completely seals the ends of the cylinders together so that external matter is kept out of the joint, and where internal matter is in the cylinders it is prevented from leaking through the joint. The connector is very valuable for joining pipes carrying inflammable fluids such as petroleum, gas, gasoline, corrosive fluids, and the like, and it is also very valuable for connecting lengths of drilling rods, and other applications where a very strong connector is required.

Included among the objects and advantages of the present invention is the provision of a connector which may be utilized on the unworked end of a cylindrical member, or for joining and sealing the ends of such cylindrical members. The connector may be used to join pipes, tubes, rods, and the like, and the connector will maintain the joint of the members under severe tension, and bending loads. The connector is arranged to completely seal the end of each cylindrical member so that there will be no leaking of matter either into or out of the connection. The connector is readily adaptable for use in the field without the need of special tools for preparing the ends of the cylindrical members for receiving the connector. The connector may be utilized to join cylindrical members together or to join a cylindrical member on other structures such as pumps, tanks, and the like.

These and other objects and advantages of the invention may be readily ascertained by referring to the following description and illustrations in which.

Figure 1:
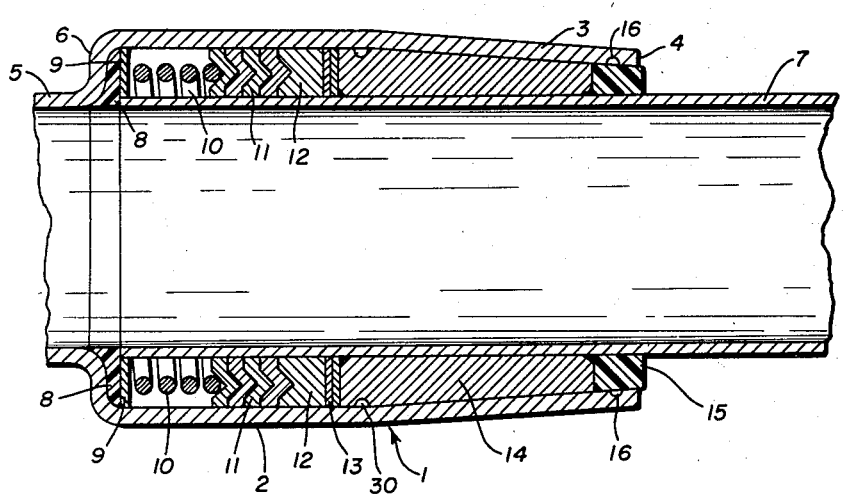
Fig. 1 is a cross-sectional view of a connector according to the invention in place on a tubular member.

In the device selected for illustration in Fig. 1, a sleeve, shown in general by numeral 1, includes a cylindrical tubular portion 2 and an adjoining tapered section 3 having an open end 4. The opposite end 5 of the member 1 is of substantially reduced diameter providing a shoulder 6 which joins the small diameter end section 5 and the cylindrical section 2. The open end 4 is arranged to telescope over a cylindrical or tubular member 7 with substantial clearance therearound. In the case of Fig. 1, the cylindrical member 7 is illustrated as a tube; however, any hollow or solid cylinder may be telescoped in the connector, depending on the use. The tube 7 telescopes within the sleeve 1, and abuts a neoprene or like-plastic seal 8 seated against the internal surface of the shoulder 6. A metal back-up ring 9, which telescopes over the end of tube 7, seats against the neoprene seal 8. A helical spring 10 is mounted internally of the sleeve 1, telescoped over the tube 7, and it abuts seal ring 11 which is positioned against a back-up ring 13. The seal ring 11 consists of a series of male seal rings which seal against each other and against the internal surface of cylinder 2 and the external surface of tube 7. The seal rings 11 are forced into the female seal ring 12 under the influence of the spring 10, forming a seal between the tube and the connector. The helical spring 10 is of sufficient length and compressibility to be compressible inwardly into the cylinder 2 against the shoulder 6 to permit considerable movement of the seal rings 11 and 12. A cylinder retainer sleeve 14 is mounted internally of the sleeve 1 in the tapered portion 3. The retainer sleeve 14 is described in detail below. The plastic or rubber dirt seal 15 seals the open end 4 of the sleeve and an annular groove 16, internally of the sleeve adjacent the end 4, provides a retainer slot into which the dirt seal can flow under pressure for maintaining the same sealed in the end 4.

Figure 3:
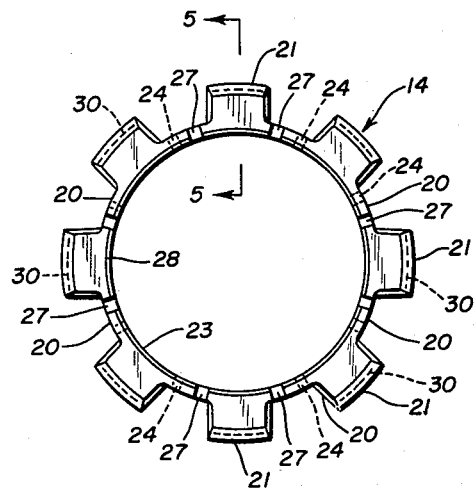
Fig. 3 is an end elevation of the clamping member of the connector of the invention.
Figure 4:
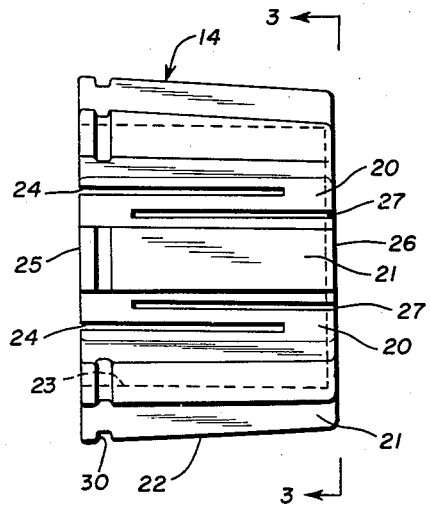
Fig. 4 is a side elevational view of the clamping member of Fig. 3.
Figure 5:
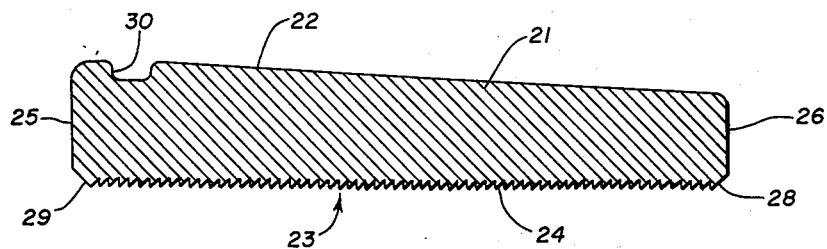
Fig. 5 is a cross-sectional view of gripping portions of the clamping member of Fig. 3, taken along section line 5—5.

The retainer sleeve 14, Figs. 3 through 5, is a relatively thick, exteriorly tapered sleeve having a plurality of notches or grooves 20 peripherally spaced about the exterior thereof. The notches 20 provide a plurality of upstanding portions 21 spaced about the sleeve forming a spline-shaped member. The upstanding portions 21 include a surface 23 of substantially the same contour as the internal surface of the tapered portion 3 of the sleeve 14. The sleeve 14 includes a cylindrical internal surface portion 23 arranged to telescope in a close fit over a cylindrical member to be joined. The surface 23 includes a substantial number of small, sharp teeth 24 or serrations for gripping an engaged cylindrical member.

Each of the grooves 20 includes a slit 24 cut longitudinally of the sleeve from the large end 25 part way through the sleeve. Each groove 20 includes another slit 27 extending from sleeve end 26 and which does not extend through the sleeve. The outer ends of the cylindrical internal surface 23 of the sleeve is bevelled at 28 and 29 to facilitate the telescoping of the sleeve over a retained cylindrical member. A groove 30 encircles the projections 21 adjacent the large end 26. The slits 24 and 27 overlap a substantial distance along the lateral length of the sleeve so that the sleeve is laterally compressible from a larger to a smaller diameter. The sleeve is normally made of metal with sufficient spring to return the sleeve back to full diameter when the compression pressure is released therefrom.

Figure 6:
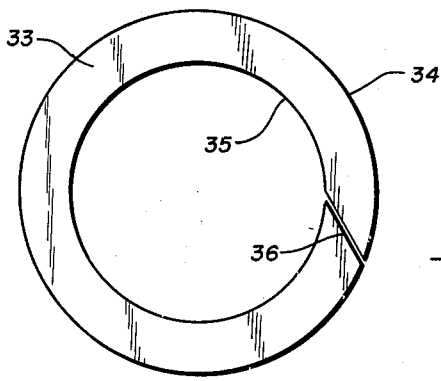
Fig. 6 is a front elevational view of back-up ring for use in the connector of the invention.

The back-up rings 13 and 9, illustrated in Fig. 6, are annular members 33 with a maximum diameter 34 slightly less than the diameter of the internal surface of the cylindrical section 2, and an internal diameter 35 slightly larger than the diameter of the tubular member to be telescoped in the device. The back-up ring 33 is divided at one portion thereof by means of a slit 36 which extends at an angle to a radius of the ring. The angle slit provides means for expansion and contraction of the ring in the event the same is necessary in movement inside the sleeve. The back-up rings are made of metal or relatively rigid plastic, reinforced plastic and the like.

In use, the retainer sleeve 14 is pushed inwardly in the sleeve compressing the spring 10 so that the sleeve 14 is permitted to expand. A pipe or cylindrical member 7 is then inserted in the sleeve to a position where the end of the pipe abuts the end seal 8. The sleeve 14 is then released and the spring pushes the sleeve into the tapered section 3, compressing the sleeve and gripping the cylindrical member. A rubber or plastic seal 15 is then forced in the open end 4 of the sleeve so as to completely seal the mechanism. The spring 10 is of such a length and construction that when the sleeve 14 is engaging a telescoped, cylindrical member the spring 10 is under compression so as to positively force the sleeve 14 into the tapered portion 3 clamping on the enclosed member. If the cylindrical members being connected are under tension, i. e., pulling the member 7 away from the sleeve 1, the sleeve 14 is pulled further into the tapered section 3 increasing the clamping pressure on the member and thereby causing a tighter connection. In bending movement, the tube is substantially reinforced by the sleeve 14 so that substantially any bending must occur beyond the sleeve section 1, and obviously there are no threads to jam on either tension or bending. On compression, the member 7 abuts the shoulder 6 forming a tighter seal, and since the spring 10 is under compression, the sleeve 14 will be positively forced into the tapered section 3 forming a tight seal.

The connector utilizes two major seals, i. e. seal 8 for the end of the pipe 7 and the seal rings 11 and 12. The secondary seal 15 adds a safeguard for the connector. These three seals insure a positive seal to prevent leaking of fluid from joined pipes even when the pipes are under various stresses and strains. One important feature is that the seals are not permanent seals but may be used many times over with effectiveness.

Figure 2:
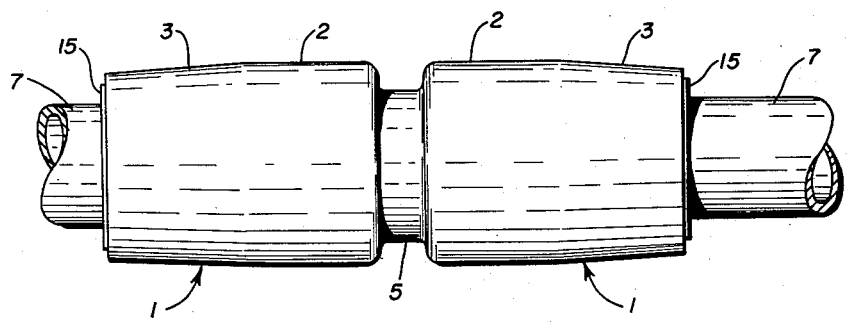
Fig. 2 is a side elevational view of a connector arranged to join two sections of a cylindrical member.

The sleeve member may be joined to another sleeve member by means of the small section 5, for example as illustrated in Fig. 2, as a connector for two tubular sections 7. In this case the sleeve section of the one side is a mirror image of the sleeve section of the other side. The portion 5 may also be directly connected, as by means of welding or other means, to a pump, a tank or the like. In any case, the clamping pressure is supplied by the retainer ring under the compression of a spring 10, and the serrations of the clamping sleeve 14 provide the necessary grip on the plain, unworked end of the cylindrical member.

To remove the pipe or cylinder from the sleeve, the retainer sleeve 14 is pressed inwardly toward the spring 10 relieving the compressive forces on the retainer sleeve and releasing the tubular member 7. A thin, elongated slip-ring may be used to pass in the opening between the sleeve and the pipe so as to bear against the sleeve, depressing the spring 10 and releasing the compressive forces on the retainer sleeve 14. The pipe is then easily removed from the sleeve. A similar slip-ring may be used to depress the spring and open the clamping ring so as to permit the entry of a pipe.

While the invention has been described by reference to particular illustrations, there is no intent to limit the concept to the precise details so described, except insofar as set forth in the following claim.

I claim:

A connector for joining lengths of tubular members comprising a hollow body arranged to telescope over endwise aligned ends of two tublular members with a substantial clearance therebetween, said body being necked down intermediate the ends thereof forming an internal shoulder in one end of said sleeve arranged to substantially abut the ends of telescoped tubular members, said hollow body member having an elongated axially tapered internal end surface from a maximum diameter at a point spaced from said shoulder to the open ends thereof, a sealing member mounted in said body arranged as a seal between said shoulder and each of the ends of telescoped tubular members, a helical spring in said body on each side of and abutting said shoulder and arranged to telescope over associated tubular members, an elongated tapered tubular clamping sleeve mounted in said body on each side of said shoulder and arranged to telescope with associated tubular members and provide a substantial contact area therebetween, the inner surface of said clamping sleeve being arranged for a normal close fit in open position permitting entry of a tubular member and a tight gripping fit in closed position on a tubular member, said springs normally urging said clamping sleeves toward said open ends of said body whereby the taper of said inner surfaces thereof tends to close said clamping sleeves, a seal between each said springs and each said clamping sleeves arranged to form second seals between said body and each telescoped tubular member, and a dust seal mounted in the outer end openings of said hollow body forming a third seal at each end between said body and each telescoped tubular member.

References Cited in the file of this patent
UNITED STATES PATENTS

| | | |
|---|---|---|
| 1,357,219 | Brewster | Nov. 2, 1920 |
| 1,586,793 | Fowler | June 1, 1926 |
| 2,017,994 | Spang | Oct. 22, 1935 |
| 2,708,124 | Robb | May 10, 1955 |